(12) United States Patent
Yoo et al.

(10) Patent No.: US 9,030,033 B2
(45) Date of Patent: May 12, 2015

(54) ENERGY REGENERATION DEVICE OF SUSPENSION SYSTEM FOR VEHICLE

(71) Applicant: Hyundai Motor Company, Seoul (KR)

(72) Inventors: Sang Hoon Yoo, Asan-si (KR); Sung Bae Jang, Suwon-si (KR); Sung-Jun Kim, Hwaseong-si (KR); Un Koo Lee, Seoul (KR); Byung Gu Kang, Seoul (KR)

(73) Assignee: Hyundai Motor Company, Seoul (KR)

( * ) Notice: Subject to any disclaimer, the term of this patent is extended or adjusted under 35 U.S.C. 154(b) by 60 days.

(21) Appl. No.: 14/034,413

(22) Filed: Sep. 23, 2013

(65) Prior Publication Data

US 2014/0132007 A1    May 15, 2014

(30) Foreign Application Priority Data

Nov. 15, 2012    (KR) .................. 10-2012-0129745

(51) Int. Cl.
| | |
|---|---|
| F02B 63/04 | (2006.01) |
| H02K 7/10 | (2006.01) |
| H02K 7/18 | (2006.01) |
| B60G 7/02 | (2006.01) |
| B60K 25/10 | (2006.01) |
| B60G 3/20 | (2006.01) |
| B60G 7/00 | (2006.01) |

(Continued)

(52) U.S. Cl.
CPC ............... *H02K 7/1846* (2013.01); *B60G 7/02* (2013.01); *B60K 25/10* (2013.01); *F03G 7/08* (2013.01); *B60G 3/202* (2013.01); *B60G 7/006* (2013.01); *B60G 2200/1442* (2013.01); *B60G 2202/12* (2013.01); *B60G 2202/135* (2013.01); *B60G 2202/24* (2013.01); *B60G 2202/42* (2013.01); *B60G 2204/143* (2013.01); *B60G 2204/419* (2013.01); *B60G 2204/4191* (2013.01); *B60G 2300/60* (2013.01)

(58) Field of Classification Search
USPC ................ 290/1 C, 1 R, 53; 701/22; 180/165
See application file for complete search history.

(56) References Cited

U.S. PATENT DOCUMENTS 3,559,027 A * 1/1971 Arsem ............................... 322/3
3,980,152 A * 9/1976 Manor .......................... 180/313

(Continued)

FOREIGN PATENT DOCUMENTS

| JP | 4739481 B2 | 8/2011 |
|---|---|---|
| KR | 1990-0004455 | 6/1990 |

(Continued)

*Primary Examiner* — Pedro J Cuevas
(74) *Attorney, Agent, or Firm* — McDermott Will & Emery LLP

(57) ABSTRACT

An energy regeneration device of a suspension system for a vehicle includes: a suspension link that connects a wheel carrier to a vehicle body; a bush unit that outputs hinge motion of the suspension link through an output gear; a one-way power transmission mechanism that receives the hinge motion transmitted from the output gear through an input gear, and outputs only one-way rotational power; a generator that is disposed at a side of the vehicle body and generates electricity while being rotated by the transmitted one-way rotational power; a speed-up mechanism that speeds up one-way rotational power transmitted from the one-way power transmission mechanism, and transmits the one-way rotational power to a rotary shaft of the generator; a rectifier that rectifies the electricity generated by the generator; and a battery that accumulates electric energy.

17 Claims, 5 Drawing Sheets

(51) Int. Cl.
*F03G 7/08* (2006.01)
*F03B 13/10* (2006.01)

(56) References Cited

U.S. PATENT DOCUMENTS

| | | | | |
|---|---|---|---|---|
| 4,032,829 | A * | 6/1977 | Schenavar | 322/3 |
| 4,295,538 | A * | 10/1981 | Lewus | 180/165 |
| 4,480,709 | A * | 11/1984 | Commanda | 310/11 |
| 4,815,575 | A * | 3/1989 | Murty | 188/266.1 |
| 4,981,309 | A * | 1/1991 | Froeschle et al. | 280/6.157 |
| 5,091,679 | A * | 2/1992 | Murty et al. | 318/153 |
| 5,337,560 | A * | 8/1994 | Abdelmalek | 60/370 |
| 5,570,286 | A * | 10/1996 | Margolis et al. | 701/36 |
| 5,590,734 | A * | 1/1997 | Caires | 180/165 |
| 5,682,980 | A * | 11/1997 | Reybrouck | 280/5.504 |
| 6,111,375 | A * | 8/2000 | Zenobi | 318/376 |
| 6,129,025 | A * | 10/2000 | Minakami et al. | 104/88.01 |
| 6,575,484 | B2 * | 6/2003 | Rogala et al. | 280/124.158 |
| 6,920,951 | B2 * | 7/2005 | Song et al. | 180/165 |
| 6,952,060 | B2 * | 10/2005 | Goldner et al. | 310/12.13 |
| 6,964,325 | B2 * | 11/2005 | Maes | 188/299.1 |
| 7,250,697 | B2 * | 7/2007 | Beaulieu | 310/12.12 |
| 7,261,171 | B2 * | 8/2007 | de la Torre et al. | 180/65.31 |
| 7,938,217 | B2 * | 5/2011 | Stansbury, III | 180/165 |
| 7,942,225 | B2 * | 5/2011 | Carabelli et al. | 180/165 |
| 7,994,648 | B1 * | 8/2011 | Fielek | 290/1 R |
| 8,063,498 | B2 * | 11/2011 | Namuduri et al. | 290/1 R |
| 8,261,865 | B2 * | 9/2012 | Stansbury, III | 180/65.31 |
| 8,283,795 | B2 * | 10/2012 | Khoury et al. | 290/1 R |
| 8,376,100 | B2 * | 2/2013 | Avadhany et al. | 188/316 |
| 8,378,509 | B2 * | 2/2013 | Oleynik et al. | 290/1 R |
| 8,392,030 | B2 * | 3/2013 | Anderson et al. | 700/286 |
| 8,629,572 | B1 * | 1/2014 | Phillips | 290/53 |
| 8,807,258 | B2 * | 8/2014 | Stansbury, III | 180/165 |
| 8,840,118 | B1 * | 9/2014 | Giovanardi et al. | 280/5.5 |
| 8,841,786 | B2 * | 9/2014 | Tucker et al. | 290/1 R |
| 8,874,291 | B2 * | 10/2014 | Gresser | 701/22 |
| 2003/0015846 | A1 * | 1/2003 | Rogala et al. | 280/5.514 |
| 2003/0030523 | A1 * | 2/2003 | Bell et al. | 335/220 |
| 2003/0034697 | A1 * | 2/2003 | Goldner et al. | 310/17 |
| 2004/0119289 | A1 * | 6/2004 | Zabramny | 290/1 R |
| 2004/0206561 | A1 * | 10/2004 | Song et al. | 180/165 |
| 2006/0016629 | A1 * | 1/2006 | Huard | 180/65.1 |
| 2006/0125325 | A1 * | 6/2006 | Beaulieu | 310/12 |
| 2007/0089919 | A1 * | 4/2007 | de la Torre et al. | 180/65.2 |
| 2007/0089924 | A1 * | 4/2007 | de la Torre et al. | 180/305 |
| 2008/0257626 | A1 * | 10/2008 | Carabelli et al. | 180/165 |
| 2010/0006362 | A1 * | 1/2010 | Armstrong | 180/165 |
| 2010/0072760 | A1 * | 3/2010 | Anderson et al. | 290/1 R |
| 2010/0281858 | A1 * | 11/2010 | Stansbury, III | 60/327 |
| 2011/0101703 | A1 * | 5/2011 | Oleynik et al. | 290/1 R |
| 2011/0130906 | A1 * | 6/2011 | Mayer | 701/22 |
| 2011/0130916 | A1 * | 6/2011 | Mayer | 701/33 |
| 2012/0146339 | A1 * | 6/2012 | Lee | 290/1 C |
| 2012/0313575 | A1 * | 12/2012 | Stansbury, III | 320/107 |
| 2013/0104534 | A1 * | 5/2013 | Six | 60/413 |
| 2013/0147205 | A1 * | 6/2013 | Tucker et al. | 290/1 A |
| 2013/0154280 | A1 * | 6/2013 | Tucker et al. | 290/1 R |
| 2014/0117673 | A1 * | 5/2014 | Phillips | 290/53 |
| 2014/0117674 | A1 * | 5/2014 | Phillips | 290/53 |
| 2014/0117676 | A1 * | 5/2014 | Goetz et al. | 290/1 R |
| 2014/0182955 | A1 * | 7/2014 | Yoo et al. | 180/65.31 |
| 2014/0183873 | A1 * | 7/2014 | Yoo et al. | 290/1 C |
| 2014/0260233 | A1 * | 9/2014 | Giovanardi et al. | 60/431 |
| 2014/0265168 | A1 * | 9/2014 | Giovanardi et al. | 280/5.5 |
| 2014/0265169 | A1 * | 9/2014 | Giovanardi et al. | 280/5.5 |
| 2014/0265170 | A1 * | 9/2014 | Giovanardi et al. | 280/5.5 |
| 2014/0313001 | A1 * | 10/2014 | Phillips | 335/306 |
| 2014/0339928 | A1 * | 11/2014 | Phillips | 310/30 |
| 2014/0353060 | A1 * | 12/2014 | Stansbury, III | 180/165 |

FOREIGN PATENT DOCUMENTS

| | | |
|---|---|---|
| KR | 10-0978298 B1 | 8/2010 |
| KR | 2010-0093803 A | 8/2010 |
| KR | 10-2012-0064846 A | 6/2012 |

\* cited by examiner

ENERGY REGENERATION DEVICE OF SUSPENSION SYSTEM FOR VEHICLE

CROSS-REFERENCE TO RELATED APPLICATION

This application claims priority to and the benefit of Korean Patent Application No. 10-2012-0129745 filed in the Korean Intellectual Property Office on Nov. 15, 2012, the entire contents of which are incorporated herein by reference.

BACKGROUND OF THE INVENTION (a) Field of the Invention

The present invention relates to an energy regeneration device of a suspension system for a vehicle. More particularly, the present invention relates to an energy regeneration device of a suspension system for a vehicle which is mounted at a vehicle body connection portion of a suspension link and regenerates rotational kinetic energy generated from wheels into electric energy.

(b) Description of the Related Art

In general, the suspension system of a vehicle is a device disposed between the car body and the wheels and connecting the two rigid bodies, using one or a plurality of links. The suspension system mechanically appropriately controls the relative motion between the vehicle body and the wheels by carrying vertical motion load with a chassis spring and a shock absorber and appropriately controlling high rigidity and flexibility in the other directions.

The suspension system is supposed to provide high riding comfort to passengers by effectively blocking irregular input from roads which is generated in traveling of a vehicle and to provide convenience for driving by appropriately controlling shaking of a vehicle which is generated by non-smoothness of roads. Further, when a vehicle travels on a non-smooth road, it is required to secure safety of the vehicle in turning and braking by maintaining the vertical load on the surfaces of tires which are in contact with the ground at an appropriate level.

Various kinds of suspension systems have been developed and actually used for vehicles to satisfy those conditions, and according to an example of the configuration of a common suspension system, as shown in FIG. 1, a wheel carrier 4 supporting a wheel 2 such that the wheel 2 can rotate is provided. The upper portion of the wheel carrier 4 is connected to a vehicle body 10 (subframe) by a front upper arm 6 and a rear upper arm 8 disposed in the transverse direction of the vehicle and the lower portion is connected to the vehicle body 10 by a lower arm 12 and an assist arm 14 which are disposed in the transverse direction of the vehicle and a trailing arm 16 disposed in the longitudinal direction of the vehicle.

Further, the upper portion of the wheel carrier 4 is connected with the vehicle body by a shock absorber 18 and a spring 20 that is an elastic member is disposed between the lower arm 12 and the vehicle body, such that the shock from a road surface is attenuated and free vibration is reduced, thereby improving riding comfort.

Further, the end of a stabilizer bar 22 that is fixed to the vehicle body is connected with the lower arm 12 by a connection link 24, thus preventing the vehicle body from rolling.

According to the configuration, the suspension system of the related art can attenuate the shock from a road surface, reduce free vibration, and prevent the vehicle body from rolling; however, the kinetic energy, which is generated by the suspension links 6, 8, 12, 14, and 16 which continuously repeat bumping and rebounding in accordance with the traveling conditions of the vehicle, is not recovered.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an energy regeneration device of a suspension system for a vehicle having advantages of being able to increase energy efficiency by regenerating kinetic energy from bumping and rebounding of a wheel, depending on traveling condition, into electric energy.

An exemplary embodiment of the present invention provides an energy regeneration device of a suspension system for a vehicle, which may include: a suspension link that connects a wheel carrier to a vehicle body; a bush unit that is disposed between a vehicle body connection portion of the suspension link and the vehicle body and outputs hinge motion of the suspension link through an output gear; a one-way power transmission mechanism that is connected with the output gear of the bush unit, receives the hinge motion transmitted from the output gear through an input gear, and outputs only one-way rotational power; a generator that is disposed at a side of the vehicle body and generates electricity while being rotated by the transmitted one-way rotational power; a speed-up mechanism that is disposed between the generator and the one-way power transmission mechanism, speeds up one-way rotational power transmitted from the one-way power transmission mechanism, and transmits the ione-way rotational power increased in speeds to a rotary shaft of the generator; a rectifier that is electrically connected with the generator and rectifies the electricity generated by the generator; and a battery that is electrically connected with the rectifier and accumulates electric energy.

The bush unit may include: an outer pipe combined with the vehicle body connection portion of the suspension link; an inner pipe disposed inside the outer pipe and fixed to a side of the vehicle body; a bush rubber disposed between the outer pipe and the inner pipe and combined with the outer pipe; an output gear connected with the bush rubber through an inner extension that extends between the rubber bush and the inner pipe; a bearing support ring fixed to the inner side of the inner extension of the output gear; and a first bearing disposed on the outer side of the inner pipe in friction contact with the bearing support ring.

The first bearing may be a plastic friction bearing.

The bearing support ring may be an injection-molded plastic product.

The energy regeneration device of a suspension system for a vehicle according to one or a plurality of exemplary embodiments of the present invention may further include a second bearing disposed between the inner side of the output gear and the outer side of the inner pipe.

The second bearing may be a needle bearing.

The one-way power transmission mechanism may include: an inner case; an outer case combined with the inner case and having a bolt insertion pipe in which a bolt is inserted; an input gear engaged with the output gear inside the inner case and the outer case and having an outer extension extending axially outward; a third bearing disposed between the outer side of the input gear and the inner side of the inner case; a fourth bearing disposed between the inner side of the outer extension and the outer side of the bolt insertion pipe; a one-way clutch disposed on the outer side of the external extension; a speed-up gear disposed on the outer side of the one-way clutch; and one or more idle gears transmitting one-way rotational power to the speed-up mechanism in mesh with the speed-up gear.

The one-way clutch may transmit rotational power from the output gear to the speed-up gear in bumping of the suspension link.

The one-way clutch may transmit rotational power from the output gear to the speed-up gear in rebounding of the suspension link.

The speed-up mechanism may include: a speed-up mechanism housing integrally formed between the generator and the one-way power transmission mechanism; and one or more planetary gear sets disposed in the speed-up mechanism housing.

The one or more planetary gear sets may be single pinion planetary gear sets.

The one or more planetary gear sets may be three single pinion planetary gear sets.

The three planetary gear sets may be connected such that a ringer of each of the single pinion gear sets is fixed to the speed-up mechanism housing and functions as a fixed element, a planetary carrier functions as an input element, and a sun gear functions as an output element.

The three planetary gear sets may be composed of: a first planetary gear set that is a single pinion planetary gear set including a first sun gear, a first ring gear, and a first planetary carrier supporting a first pinion being in mesh with the first sun gear and the first ring gear therebetween; a second planetary gear set that is a single pinion planetary gear set including a second sun gear, a second ring gear, and a second planetary carrier supporting a second pinion being in mesh with the second sun gear and the second ring gear therebetween; and a third planetary gear set that is a single pinion planetary gear set including a third sun gear, a third ring gear, and a third planetary carrier supporting a third pinion being in mesh with the third sun gear and the third ring gear therebetween.

The first, second, and third ring gears of the first, second, and third planetary gear sets may be integrally formed and fixed to the inner side of the speed-up mechanism housing, the first sun gear may be connected with the second planetary carrier, the second sun gear may be connected with the third planetary carrier, and rotational power inputted from the one-way power transmission mechanism through the first planetary carrier may be increased in speeds and transmitted to the rotary shaft of the generator through the third sun gear.

The suspension link may be one of links connecting the wheel carrier with the vehicle body in a rear wheel strut type of suspension.

The suspension link may be one of links connecting the wheel carrier with the vehicle body, in a dual link type, wishbone type, or double wishbone type of suspension.

Figure 1:
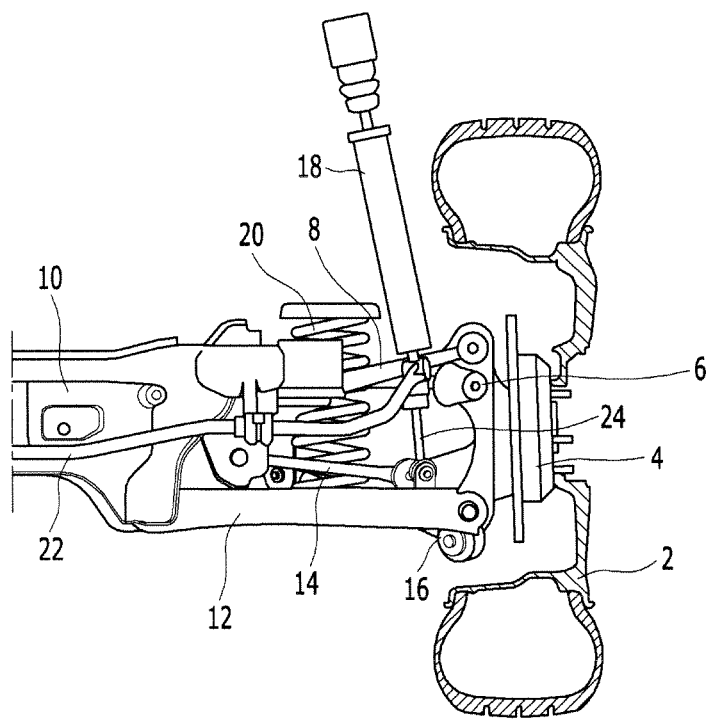
FIG. 1 is a schematic diagram of an example of a common suspension system.

| <Description of symbols> | |
|---|---|
| 30: Suspension link | |
| 31: Vehicle body connection portion | |
| 40: Bush unit | 41: Output gear |
| 42: Outer pipe | 43: Inner pipe |
| 44: Bush rubber | 45: Bearing support ring |
| 46: First bearing | 47: Second bearing |
| 50: One-way power transmission mechanism | 51: Input gear |
| 52: Inner case | 53: Outer case |
| 54: Third bearing | 55: Fourth bearing |
| 56: One-way clutch | 57: Speed-up gear |
| 58: Idle gear | 59: Driving gear |
| 60: Generator | 70: Speed-up mechanism |
| 71: Speed-up mechanism housing | 80: Rectifier |
| 90: Battery | 100: Vehicle body |

DETAILED DESCRIPTION OF THE EMBODIMENTS

Exemplary embodiments of the present invention will be described hereafter in detail with reference to the accompanying drawings.

Further, the sizes and thicknesses of the configurations shown in the drawings are provided selectively for the convenience of description, such that the present invention is not limited to those shown in the drawings and the thicknesses are exaggerated to make some parts and regions clear.

The unrelated parts to the description of the exemplary embodiments are not shown to make the description clear and like reference numerals designate like element throughout the specification.

Figure 2:
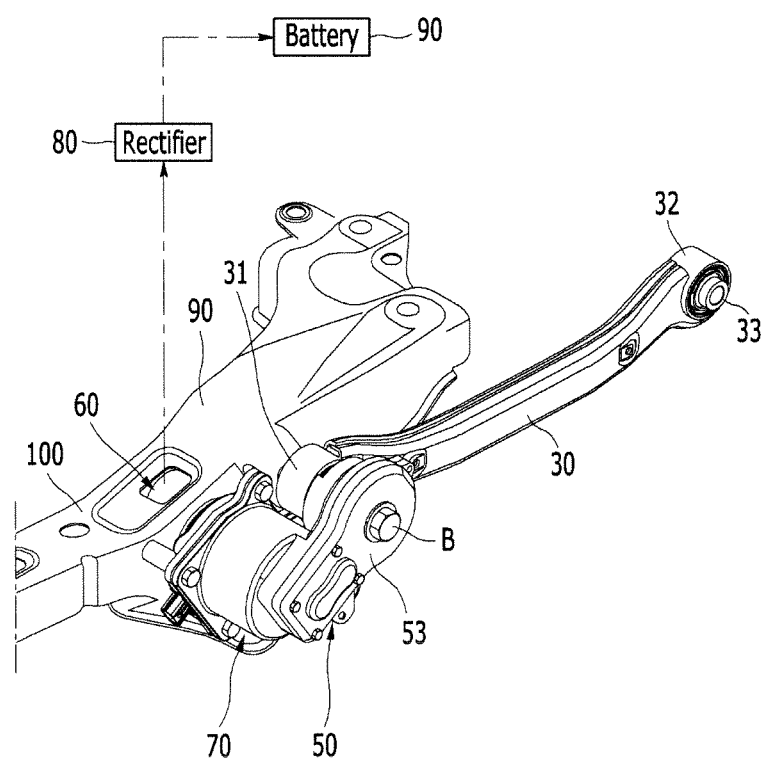
FIG. 2 is a perspective view showing an energy regeneration device according to an exemplary embodiment of the present invention.
Figure 3:
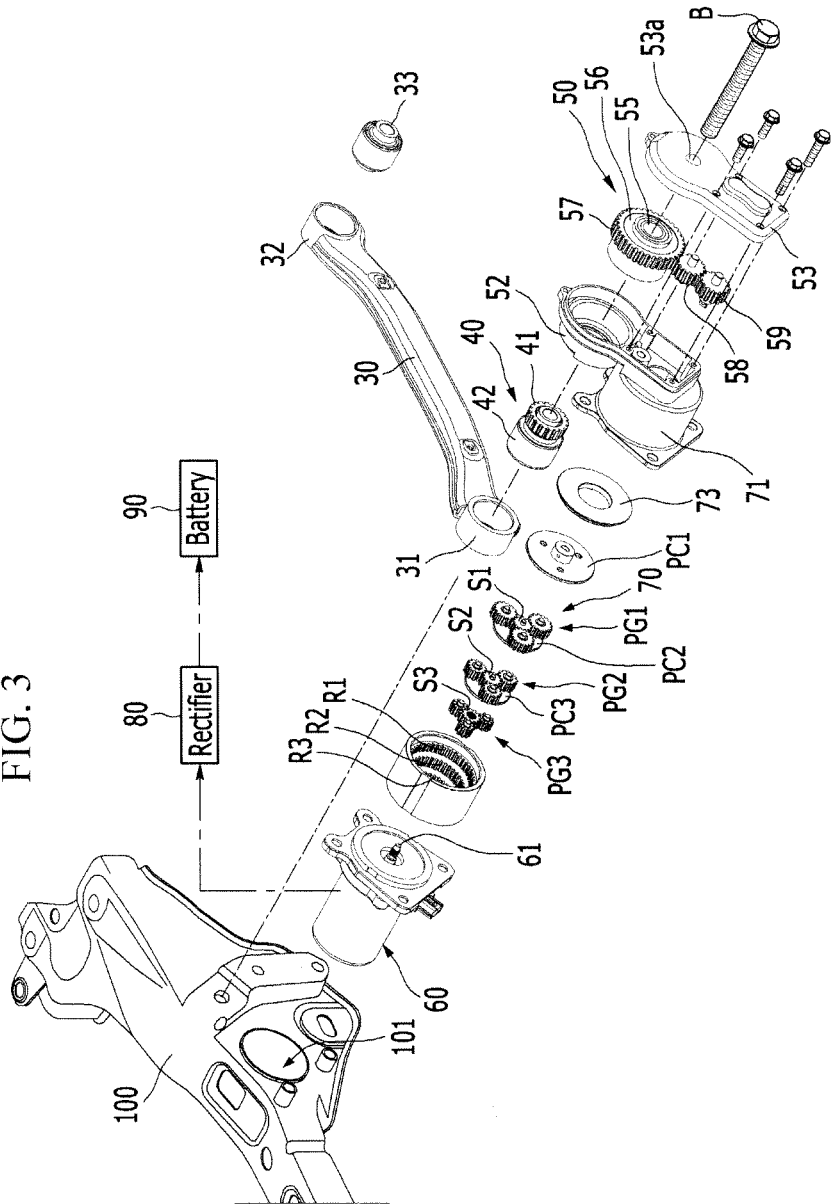
FIG. 3 is an exploded perspective view showing the energy regeneration device according to an exemplary embodiment of the present invention.

FIG. 2 is a perspective view showing an energy regeneration device according to an exemplary embodiment of the present invention and FIG. 3 is an exploded perspective view showing the energy regeneration device according to an exemplary embodiment of the present invention.

Referring to FIGS. 2 and 3, an energy regeneration device according to an exemplary embodiment of the present invention includes a suspension link 30, a bush unit 40, a one-way power transmission mechanism 50, a generator 60, a speed-up mechanism 70, a rectifier 80, and a battery 90.

The suspension link 30 means all of links that connect a wheel carrier (see FIG. 1) to a vehicle body 100 (rear wheel member) and continuously bump and rebound, depending on the condition of a road.

The energy regeneration device according to an exemplary embodiment of the present invention is applied to a rear wheel strut type of suspension, as an example, but is not limited thereto.

That is, the suspension link 30 may be applied to all types of links that connect a wheel carrier to a vehicle body to make a link operation, in all types of suspensions, including a multilink type, a dual link type, and a (double) wishbone type, and may be applied to the front wheels too.

The bush unit 40 is disposed between the vehicle body connection portion 31 of the suspension link 30 and the vehicle body 100 and outputs two-way rotational power of the vehicle body connection portion 31 due to rotation (pivoting) of the suspension link 30 through an output gear 41.

The one-way power transmission mechanism 50 is connected with the output gear 41 of the bush unit 40, receives the two-way rotation transmitted from the output gear 41 through an input gear 51, and transmits one-way rotational power to the speed-up mechanism 70.

The generator 60 generates electric energy while being rotated by the one-way rotational power transmitted from the speed-up mechanism 70.

The speed-up mechanism 70 speeds up the one-way rotational power transmitted from the one-way power transmission mechanism 50 and transmits the rotational power increased in speeds to a rotary shaft 61 of the generator 60.

Further, the rectifier 80 is electrically connected with the generator 60 and rectifies the electricity generated by the generator 60 and the battery 90 is electrically connected with the rectifier 80 and accumulates electric energy.

The configuration of the energy regeneration device is described in more detail. The suspension link 30, a link member having a predetermined length, has a wheel connection portion 32 and the vehicle body connection portion 31 formed at both ends, respectively, the wheel connection portion 32 is connected with a wheel carrier (4 in FIG. 1) by a rubber bush 33, and the vehicle body connection portion 31 is fastened to the vehicle body 100 through the bush unit 40 by a bolt B.

Therefore, as the wheel connection portion 32 revolves (hinge motion) around the vehicle body connection portion 31, depending on the condition of a road, the vehicle body connection portion 31 generates rotational power in one direction (forward) and the other direction (backward) through the bush unit 40.

Figure 4:
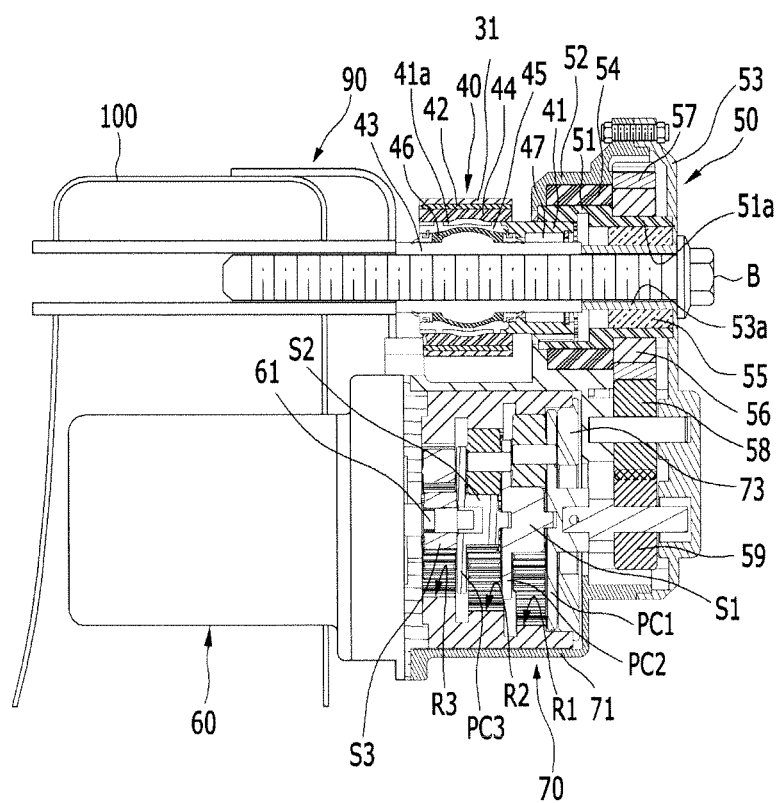
FIG. 4 is a cross-sectional view taken along line A-A in FIG. 1.

The bush unit 40 includes, as shown in FIG. 4, an outer pipe 42, an inner pipe 43, a bush rubber 44, the output gear 41, a bearing support ring 45, and a first bearing 46.

The outer pipe 42 is fitted and fixed in the vehicle body connection portion 31 of the suspension link 30 and the inner pipe 43 is disposed inside the outer pipe 42 and fastened to a side of the vehicle body 100 by the bolt B.

The bush rubber 44 is disposed between the outer pipe 42 and the inner pipe 43 and may be bonded to the inner side of the outer pipe 42.

The outer gear 41 has an inner extension 41*a* extending between the rubber bush 44 and the inner pipe 43 and is connected to the bush rubber 44 by the inner extension 41*a*.

The bearing support ring 45 is fixed to the inner side of the inner extension 41*a* of the output gear 41.

The first bearing 46 may be a plastic friction bearing and disposed on the outer side of the inner pipe 43.

The first bearing 46 and the bearing support ring 45 may be injection-molded plastic products and may be in contact with each other with the friction coefficient minimized.

A second bearing 47 may be disposed between the inner side of the output gear 41 and the outer side of the inner pipe 43, in which the second bearing 47 may be a needle bearing.

The one-way power transmission mechanism 50 includes an inner case 52 and an outer case 53, the inner case 52 is disposed at the bush unit 40, and the outer case 53 is combined with the inner case 52 on the outside.

A bolt insertion pipe 53*a* extending axially inward to pass the bolt B through it is formed at the outer case 53.

Further, the one-way power transmission mechanism 50 includes an input gear 51, a third bearing 54, a fourth bearing 55, a one-way clutch 56, a speed-up gear 57, and one or more idle gears 58 and 59, which are disposed inside the inner case 52 and the outer case 53.

The input gear 51 has teeth around the inner side, engages with the output gear 41 inside the inner case 52 and the outer case 53, and has an outer extension 51*a* extending axially outward.

The third bearing 54 is disposed between the outer side of the input gear 51 and the inner side of the inner case 52 and the fourth bearing 55 is disposed between the inner side of the outer extension 51*a* and the outer side of the bolt insertion pipe 53*a*.

The one-way clutch 56 is disposed on the outer side of the outer extension 51*a* of the input gear 51 and the speed-up gear 57 is disposed on the outer side of the one-way clutch 56. The speed-up gear 57 receives only one-way rotational power from the one-way clutch 56 and rotates only in one direction.

Further, as shown in FIG. 3, the two idle gears 58 and 59 are in mesh with the speed-up gear 57 and transmit the one-way rotational power from the speed-up gear 57 to the speed-up mechanism 70. Although two idle gears 58 and 59 are provided in the drawings, the present invention is not limited thereto and one or three or more idle gears may be provided, depending on the space inside the inner case 52 and the outer case 53 and the number of teeth of the idle gears.

The one-way clutch 56 is disposed to connect the rotational power of the output gear 41 to the speed-up gear 57, when the suspension link 30 bumps, but the present invention is not limited thereto, and when the direction of the one-way clutch 56 is changed, it may connect the rotational power of the output gear 41 to the speed-up gear 57 when the suspension link 30 rebounds.

The generator 60 may be inserted in an installation hole 101 formed at one side of the member sided the vehicle body 100.

The generator 60 generates electricity, using the rotational power transmitted from the speed-up mechanism 70 increased in speeds.

The speed-up mechanism 70 includes one or more planetary gear sets PG1, PG2, and PG3 disposed in a speed-up mechanism housing 71 integrally formed between the generator 60 and the one-way power transmission mechanism 50, and although three planetary gear sets are provided in the drawings, the present invention is not limited thereto and an appropriate number of planetary gear sets that can increase the rotational speed in bumping or rebounding to the optimum speed for the generator 60 to generate electricity may be provided. The configuration composed of three planetary gear sets PG1, PG2, and PG3 is exemplified herein for better comprehension and ease of description.

All the three planetary gear sets PG1, PG2, and PG3 may be single pinion planetary gear sets and are connected such that ring gears R1, R2, and R3 of the single planetary gear sets PG1, PG2, and PG3, respectively, are fixed to the speed-up mechanism housing 71 to function as fixed elements, planetary carriers PC1, PC2, and PC3 function as input elements, and sun gears S1, S2, and S3 function as output element.

The first planetary gear set PG1, as a single pinion planetary gear set, includes the first sun gear S1, the first ring gear R1, and the first planetary carrier PC1 supporting a first pinion P1 being in mesh with the first sun gear S1 and the first ring gear R1 therebetween.

The second planetary gear set PG2, as a single pinion planetary gear set, includes the second sun gear S2, the second ring gear R2, and the second planetary carrier PC2 supporting a second pinion P2 being in mesh with the second sun gear S2 and the second ring gear R2 therebetween.

The third planetary gear set PG3, as a single pinion planetary gear set, includes the third sun gear S3, the third ring gear R3, and the third planetary carrier PC3 supporting a third pinion P3 being in mesh with the third sun gear S3 and the third ring gear R3 therebetween.

In the first, second, and third planetary gear sets PG1, PG2, and PG3, the first, second, and third ring gears R1, R2, and R3 are integrally formed and fixed to the inner side of the speed-up mechanism housing 71, the first sun gear S1 is connected with the second planetary carrier PC2, and the second sun gear S2 is connected with the third planetary carrier PC3.

Accordingly, the speed-up mechanism 70 increases the rotational speed inputted through the first planetary carrier PC1 from the idle gear 59 of the one-way power transmission mechanism 50 in several steps and transmits the increased the rotational speed to the rotary shaft 61 of the generator 60 through the third sun gear S3.

The first planetary carrier PC1 is supported by a support disc 73.

Figure 5:
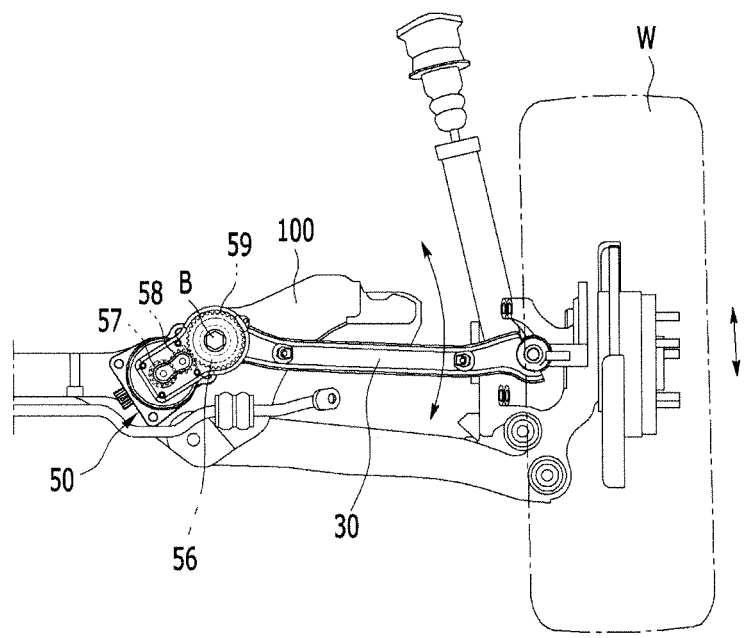
FIG. 5 is a view illustrating an operation status of the energy regeneration device according to an exemplary embodiment of the present invention.

Therefore, in the energy regeneration device of a suspension system for a vehicle having the configuration described above, as shown in FIG. 5, as the wheel W continuously repeats bumping and rebounding, depending on the condition of the surface of a road, the suspension link 30 repeatedly rotates the outer pipe 42 of the bush unit 40 in one direction (forward) and the other direction (backward) inside the vehicle body connection portion 31.

Accordingly, the outer pipe 42 attenuates the rotational force with the bush rubber 44 and transmits the rotational force to the output gear 41 and the output gear 41 transmits rotational power to the one-way clutch 56 through the input gear 51.

The speed-up gear 57 transmits the one-way rotational power to the speed-up mechanism 70 through the idle gears 58 and 59 and the speed-up mechanism 70 speeds up the one-way rotational power inputted by the operation of one or more planetary gear sets PG1, PG2, and PG3 and transmits the one-way rotational power increased in speeds to the generator 60, thereby generating electricity.

The electricity generated by the generator 60 is rectified by the rectifier 80, as described above, and the battery 90 is charged.

That is, the kinetic energy from movement of a vehicle is regenerated into electric energy, such that energy efficiency can be increased.

Further, the energy regeneration device operating with the configuration, as described above, can be applied to the vehicle body connection portion of all of suspension links pivoting up/down, depending on the condition of a road regardless of the configuration type of the suspension, that is, all types of links connecting a wheel carrier with a vehicle body to make a link operation, in all of suspension links, including a multilink type, a Macpherson type, a dual link type, and a (double) wishbone type, and can regenerate energy.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An energy regeneration device of a suspension system for a vehicle, the device comprising:
    a suspension link that connects a wheel carrier to a vehicle body;
    a bush unit that is disposed between a vehicle body connection portion of the suspension link and the vehicle body and outputs hinge motion of the suspension link through an output gear;
    a one-way power transmission mechanism that is connected with the output gear of the bush unit, receives the hinge motion transmitted from the output gear through an input gear, and outputs only one-way rotational power;
    a generator that is disposed at a side of the vehicle body and generates electricity while being rotated by the transmitted one-way rotational power;
    a speed-up mechanism that is disposed between the generator and the one-way power transmission mechanism, speeds up one-way rotational power transmitted from the one-way power transmission mechanism, and transmits the one-way rotational power increased in speeds to a rotary shaft of the generator;
    a rectifier that is electrically connected with the generator and rectifies the electricity generated by the generator; and
    a battery that is electrically connected with the rectifier and accumulates electric energy.

2. The device of claim 1, wherein the bush unit includes:
    an outer pipe combined with the vehicle body connection portion of the suspension link;
    an inner pipe disposed inside the outer pipe and fixed to a side of the vehicle body;
    a bush rubber disposed between the outer pipe and the inner pipe and combined with the outer pipe;
    an output gear connected with the bush rubber through an inner extension that extends between the rubber bush and the inner pipe;
    a bearing support ring fixed to the inner side of the inner extension of the output gear; and
    a first bearing disposed on the outer side of the inner pipe in friction contact with the bearing support ring.

3. The device of claim 2, wherein the first bearing is a plastic friction bearing.

4. The device of claim 2, wherein the bearing support ring is an injection-molded plastic product.

5. The device of claim 2, further comprising a second bearing disposed between the inner side of the output gear and the outer side of the inner pipe.

6. The device of claim 5, wherein the second bearing is a needle bearing.

7. The device of claim 1, wherein the one-way power transmission mechanism includes:
    an inner case;
    an outer case combined with the inner case and having a bolt insertion pipe in which a bolt is inserted;
    an input gear engaged with the output gear inside the inner case and the outer case and having an outer extension extending axially outward;
    a third bearing disposed between the outer side of the input gear and the inner side of the inner case;
    a fourth bearing disposed between the inner side of the outer extension and the outer side of the bolt insertion pipe;
    a one-way clutch disposed on the outer side of the external extension;
    a speed-up gear disposed on the outer side of the one-way clutch; and
    one or more idle gears transmitting one-way rotational power to the speed-up mechanism in mesh with the speed-up gear.

8. The device of claim 7, wherein the one-way clutch transmits rotational power from the output gear to the speed-up gear in bumping of the suspension link.

9. The device of claim 7, wherein the one-way clutch transmits rotational power from the output gear to the speed-up gear in rebounding of the suspension link.

10. The device of claim 1, wherein the speed-up mechanism includes:
   a speed-up mechanism housing integrally formed between the generator and the one-way power transmission mechanism; and
   one or more planetary gear sets disposed in the speed-up mechanism housing.

11. The device of claim 10, wherein the one or more planetary gear sets are single pinion planetary gear sets.

12. The device of claim 10, wherein the one or more planetary gear sets are three single pinion planetary gear sets.

13. The device of claim 12, wherein the three planetary gear sets are connected such that
   a ringer of each of the single pinion gear sets is fixed to the speed-up mechanism housing and functions as a fixed element,
   a planetary carrier functions as an input element, and
   a sun gear functions as an output element.

14. The device of claim 12, wherein the three planetary gear sets are composed of:
   a first planetary gear set that is a single pinion planetary gear set including a first sun gear, a first ring gear, and a first planetary carrier supporting a first pinion being in mesh with the first sun gear and the first ring gear therebetween;
   a second planetary gear set that is a single pinion planetary gear set including a second sun gear, a second ring gear, and a second planetary carrier supporting a second pinion being in mesh with the second sun gear and the second ring gear therebetween; and
   a third planetary gear set that is a single pinion planetary gear set including a third sun gear, a third ring gear, and a third planetary carrier supporting a third pinion being in mesh with the third sun gear and the third ring gear therebetween.

15. The device of claim 14, wherein the first, second, and third ring gears of the first, second, and third planetary gear sets are integrally formed and fixed to the inner side of the speed-up mechanism housing,
   the first sun gear is connected with the second planetary carrier and the second sun gear is connected with the third planetary carrier, and
   rotational power inputted from the one-way power transmission mechanism through the first planetary carrier is increased in speeds and transmitted to the rotary shaft of the generator through the third sun gear.

16. The device of claim 1, wherein the suspension link is one of links connecting the wheel carrier with the vehicle body in a rear wheel strut type of suspension.

17. The device of claim 1, wherein the suspension link is one of links connecting the wheel carrier with the vehicle body, in a dual link type, wishbone type, or double wishbone type of suspension.

* * * * *